United States Patent [19]

Descamps et al.

[11] Patent Number: 5,162,397
[45] Date of Patent: Nov. 10, 1992

[54] SILICONE FOAMS

[75] Inventors: Pierre Descamps, Seneffe, Belgium; Andreas T. F. Wolf, Midland, Mich.

[73] Assignee: Dow Corning S.A., Seneffe, Belgium

[21] Appl. No.: 849,549

[22] Filed: Mar. 11, 1992

[30] Foreign Application Priority Data

Apr. 2, 1991 [GB] United Kingdom ............... 9106809

[51] Int. Cl.$^5$ .............................. C08J 9/02; C08J 9/32
[52] U.S. Cl. ................................... 523/219; 523/218; 521/86; 521/54; 521/55; 521/154
[58] Field of Search .................. 523/219, 218; 521/54, 521/55, 154, 86

[56] References Cited

U.S. PATENT DOCUMENTS 4,762,859  8/1988  Modic et al. ...................... 521/154
5,010,115  4/1991  Grisoni ............................. 521/154

Primary Examiner—Morton Foelak
Attorney, Agent, or Firm—Robert Spector

[57] ABSTRACT

A foamable silicone composition comprises a polysiloxane having silicon-bonded hydrogen atoms, a polysiloxane having siloxane units including unsaturated groups, a polysiloxane having silicon-bonded hydroxyl groups, a noble metal catalyst and from 3 to 40 parts by weight per 100 parts by weight of the composition of entities of borosilicate or silicate glass or mixtures thereof. The composition comprises first and second Parts A and B having viscosities which are sufficiently similar to each other to permit facile machine mixing of the Parts; the first Part comprises the noble metal catalyst and a portion of the entities and the second Part comprises the polysiloxane having silicon-bonded hydrogen atoms and a portion of the entities pretreated with a compatible silane or a polysiloxane having silicon-bonded hydrogen atoms. Preferred entities comprise hollow spherical particles or hollow entities which have an irregular configuration. Preferably the entities of the first Part of the composition have been treated with a compatible silane. Preferred compatible silanes are vinyl silanes. The compositions are suitable for producing rigid fire resistant foamed articles resistant to compression and deflection and may be used in the production of building elements.

18 Claims, No Drawings

SILICONE FOAMS

This invention is concerned with silicone foams.

Liquid, foam forming, curable silicone compositions are available which flow and foam readily at room or slightly elevated temperature to provide a cured foam product. It has been proposed to employ foamable silicone based room temperature curable compositions for various purposes, including applications where fire resistance is desirable. For many fire resistant applications it is desirable to employ a foam which has a low density and good mechanical properties. However, silicone foams generally are of a comparatively high density and it is generally accepted that the fire resistance and mechanical properties of silicone foams of lower density are poorer than the fire resistance and mechanical properties of silicone foams of higher density.

Various expedients have been proposed for the production of silicone foams of reduced density, but it remains a problem to provide a silicone composition which can be processed readily to provide a foam of comparatively low density having good mechanical properties. It has been proposed for example, to employ glass spheres in silicone compositions which yield foams of improved mechanical properties and somewhat reduced density. However, such compositions are not readily processed. Curable foamable silicone compositions are normally formulated in two Parts for admixture, and casting, extrusion or injection into a mould or cavity. In order to achieve ease of processing by conventional mixing, casting, injection or extrusion machines used for the moulding of silicone foams and the like it is necessary that the Parts of the composition are of comparable viscosities. This dictates that when glass spheres are used with a view to reducing density of the foam produced, if a significant proportion of spheres is employed the Parts of the composition should be formulated so that each contains some of the glass spheres otherwise the viscosities of the Parts are so different that adequate mixing of the Parts is not readily possible. We have found that when untreated glass spheres are present in each of the Parts of the composition, the composition is not stable in storage for more than a few days, or the cure characteristics are impaired. We have now found, surprisingly, that cured silicone foams of low density and good mechanical properties may be formed without use of special process steps from formulations which include certain selected hollow entities.

The invention provides in one of its aspects a foamable silicone composition comprising a polysiloxane having silicon-bonded hydrogen atoms, a polysiloxane having siloxane units including unsaturated groups, a polysiloxane having silicon-bonded hydroxyl groups, a noble metal catalyst and from 3 to 40 parts by weight per 100 parts by weight of the composition of entities of borosilicate or silicate glass or mixtures thereof, the composition comprising first and second Parts having viscosities which are sufficiently similar to each other to permit facile machine mixing of the Parts and the first Part comprising the noble metal catalyst and a portion of the entities and the second Part comprising the polysiloxane having silicon-bonded hydrogen atoms and a portion of the entities pretreated with a compatible silane or a polysiloxane having silicon-bonded hydrogen atoms.

In a composition according to the invention the polysiloxane having silicon-bonded hydrogen atoms comprises one or more organosilicon polymer including siloxane units having a silicon-bonded hydrogen atom. Suitable materials are those polysiloxanes having units according to the general formula

in which each R represents a monovalent hydrocarbon group containing 1 to 20 carbon atoms, for example a lower alkyl or phenyl group e.g. a methyl group, and p is 1 or 2. These alkylhydrogen polysiloxanes may also comprise units

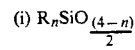

in which R is as referred to above and D is 1, 2 or 3. Preferably, the polysiloxane has from 0.3% to 2.5% by weight of silicon-bonded hydrogen atoms. We prefer that each R represents a methyl group. Preferably, terminal groups of the alkylhydrogen polysiloxane have the formula $R_3SiO_{\frac{1}{2}}$ where each R represents a methyl group. Suitable alkylhydrogen polysiloxanes include those comprising MeHSiO units with or without the presence of $Me_2SiO$ (where Me represents a methyl group) units and having viscosities of the order of from about 1 to about 1000 mm$^2$/s more preferably from about 5 to about 50 mm$^2$/s.

In a composition according to the invention the polysiloxane having siloxane units including unsaturated groups, and the polysiloxane having silicon-bonded hydroxyl groups, serve to interact with the polysiloxane having silicon-bonded hydrogen atoms to generate a network of interconnected polysiloxane chains. The addition reaction which occurs between the siloxane units including unsaturated groups and the polysiloxane having silicon-bonded hydrogen atoms yields chain extended or crosslinked elastomeric silicone products, but does not generate volatile materials for causing foaming in the curing composition. Suitable polysiloxanes having siloxane units including unsaturated groups include those having siloxane units according to the general formula

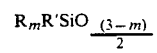

in which each R represents a monovalent hydrocarbon group having up to 20 carbon atoms, for example a lower alkyl or phenyl group e.g. a methyl radical, m is 1 or 2 and R' represents an aliphatically unsaturated group for example cyclohexenyl or a group CH=CHR" linked to the silicon atom for example via a divalent aliphatic chain wherein R" represents a hydrogen atom or an alkyl group for example vinyl, allyl or hexenyl. These polysiloxanes also comprise units (i) in which R and n are as referred to above. These materials are reactive with the silicon-bonded hydrogen atoms in presence of a noble metal catalyst by a hydrosilylation reaction and thus contribute to the polysiloxane matrix. Preferably these polysiloxanes have from 0.0002% to 3% by weight of aliphatically unsaturated groups and D is such that they have a viscosity of the order of about 10 mm$^2$/s to about 500,000 mm$^2$/s. Preferred compositions employ a polysiloxane having siloxane units according to the general formula

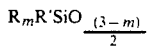

in which R' represents a group CH=CH$_2$ linked to the silicon atom via a divalent aliphatic chain and having a viscosity in the range 100 mm$^2$/s to 2000 mm$^2$/s.

In a composition according to the invention the polysiloxane having silicon-bonded hydroxyl groups comprises one or more polysiloxane having at least two siloxane units providing a silicon-bonded hydroxyl group. These materials include polydiorganosiloxanes having at least two siloxane units of the general formula

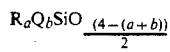

in which Q represents a hydroxyl group or a hydroxyl bearing organic group, a is 0, 1 or 2, b is 1 or 2 and the sum of a and b is less than 4, for example silanol terminated polydioganosiloxanes according to the general formula HO((R$_2$)SiO)$_s$H in which each R represents a methyl group and s has a value from about 10 to about 1200. Suitable materials have viscosities of the order of about 10 mm$^2$/s to about 500,000 mm$^2$/s. The polysiloxanes having silicon-bonded hydroxyl groups interact with the polysiloxanes having silicon-bonded hydrogen atoms to generate hydrogen gas which is trapped as bubbles as the polysiloxane network forms. Preferred compositions which provide the more elastomeric foams employ polydiorganosiloxanes according to the general formula HO((R$_2$)SiO)$_s$H as aforesaid which have viscosities of the order of about 2,500 mm$^2$/s to about 25,000 mm$^2$/s. The density of the silicone foam can be significantly reduced without degrading its structural strength by including a short-chain silanol terminated polydiorganosiloxane in the formulation. Preferred compositions employ polydiorganosiloxanes according to the general formula HO(R$_2$HSiO)$_s$H as aforesaid in which s has a value from about 2 to about 10. Preferred materials have viscosities of the order of about 5 mm$^2$/s to about 100 mm$^2$/s. Polydiorganosiloxanes having at least two siloxane units of the formula

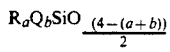

in which Q is a hydroxyl bearing alkylene or oxyalkylene chain may also be used. The chain may be attached to the silicon atom in any convenient way but is preferably linked to the silicon atom by a carbon atom. Suitable hydroxyl bearing chains include those containing up to 50 chain atoms. Suitable alkylene chains are those having 1 to 15, more preferably 4 to 10 chain carbon atoms. Suitable oxyalkylene chains include those of the formula (C$_d$H$_{2d}$O)$_e$H in which d has the value 2, 3 or 4 and e has a value in the range 1 to 15 more preferably 1 to 10, i.e. having from 1 to 15, more preferably 1 to 10 oxyalkylene groups. The oxyalkylene groups may be for example oxyethylene, oxypropylene or oxybutylene or mixtures thereof, the most preferred being the oxyethylene group. These hydroxyl bearing polysiloxanes also comprises siloxane units (i) as aforesaid. Other materials which may be included as crosslinking agents include materials having three or more functional e.g. hydroxy groups per molecule.

A composition according to the invention includes a noble metal catalyst which may be for example a rhodium or platinum containing material. Platinum catalysts may take any of the known forms ranging from platinum as deposited on carriers such as silica gel or powdered charcoal to platinic chloride, salts of platinum and chloroplatinic acids. A preferred form of platinum is chloroplatinic acid either as the commonly obtainable hexahydrate or the anhydrous form, on account of its easy dispersibility in organosilicon systems and its non-effect on colour of the mixture. Platinum complexes may also be used e.g. those prepared from chloroplatinic acid hexahydrate and divinyl tetramethyldisiloxane. Compositions according to the invention foam and cure very rapidly when the component Parts have been mixed together. If it is desired to prolong the cure time, for example if it is desired to mix the composition and then transfer it to the site where it is intended to foam and cure, one may include in the composition one of the known platinum catalyst inhibitors such as a polymethylvinylsiloxane cyclic compound or an acetylenic alcohol e.g. methyl butynol. Larger proportions of catalyst may be used when a faster cure is desired. For cost reasons we prefer to minimise the proportion of noble metal catalyst employed.

Compositions according to the invention foam and cure when mixed at room temperature and humidity. Accordingly the reactive components are stored with the polysiloxane having silicon-bonded hydrogen atoms and the catalyst in separate Parts of the composition until required for use.

A composition according to the invention comprises glass entities of borosilicate or silicate glass or mixtures thereof. These entities contribute to fire resistance and strength of the cured foam. Plain (monolithic) or hollow glass entities can be employed resulting in comparable structural strength (compression resistance) of the cured foam compositions. Hollow glass spheres with low particle densities are the preferred species to permit formulation of silicone foams of low specific density. For particle densities of hollow glass spheres from around 0.18 to around 0.28 g/cm$^3$, the dependency of the specific gravity of the cured silicone foam on the filler content is small. Preferably, at least some of these hollow glass entities are made from borosilicate glass. They may be of any desired configuration provided they are sufficiently pressure resistant for the foam to be processable on industrial metering and mixing equipment without destroying the entities. The hollow entities may be filled with either air or nitrogen; where optimum fire resistance is desired, nitrogen filled entities are preferred. These entities may be used to provide up to about 40% by weight of the composition but proportions in excess of 25% by weight of the composition lead to more difficult processing of the composition, which may in part be overcome by adjusting the proportion of other fillers present or by adding a surfactant to the composition. We prefer to employ the hollow entities in the range 5 to 15% by weight of compositions intended to have self-levelling properties and we prefer to employ the hollow entities in the range 10 to 25% by weight of compositions intended to have controlled slump properties. In order for the composition to be processable on industrial metering and mixing equipment the liquid Parts of the composition should have viscosities which are sufficiently similar to each other to permit facile machine mixing of the Parts i.e. the Parts should have similar apparent viscosities under the mixing shear conditions. For this reason, the glass entities are distributed between Parts A and B in order that each of the Parts is of comparable viscosity so that the first and second Parts may be mixed together in a desired ratio, e.g. 1:1 by volume or by weight. For a composition containing ground quartz as a supplementary filler principally in the Part of the composition containing the noble metal catalyst, we have found that the entities should provide from 0 to 30% by weight of the Part of the composition containing the noble metal catalyst and that the entities should provide from 6 to 50% by weight of the Part of the composition containing the polysiloxane having silicon-bonded hydrogen atoms. It should be noted that the addition of the glass microspheres to the composition initially (at low proportions) results in a lower apparent viscosity than of the original composition. At higher addition levels the apparent viscosity increases again beyond that of the composition containing no glass microspheres. A different distribution of the hollow glass spheres may be used depending on whether any other filler is present and in which Part of the composition this filler is present. It is essential that the entities in the Part of the composition containing the polysiloxane having silicon-bonded hydrogen atoms have been pretreated with a compatible silane or with a polysiloxane having silicon-bonded hydrogen atoms. Suitable silanes include methyltrialkoxysilanes, vinyltrialkoxysilanes and methacryloxypropyltrialkoxysilanes. Suitable polysiloxanes having silicon-bonded hydrogen atoms are as described above, the preferred materials being trimethylsilyl endblocked polymethylhydrogensiloxanes having a viscosity of about 30 mm$^2$/s and a hydrogen content of 1.5 mole%. If these entities are not pretreated with a compatible silane or polysiloxane having silicon-bonded hydrogen atoms this Part of the composition is unlikely to be stable in storage for more than a few days. It is not essential that the entities in the Part of the composition containing the noble metal catalyst be pretreated. However, if these entities are not pretreated it is necessary to use 1.4% or more of the catalyst by weight of the composition to achieve a short cure time, whereas when entities pretreated with a compatible silane or polysiloxane are employed it is possible to formulate compositions which employ as little as about 0.4% or less of the catalyst by weight of the composition to achieve a desirably short cure time. Thus, preferred compositions employ hollow borosilicate or sodium silicate glass entities or mixtures thereof in both Parts which have been pretreated in specific ways to ensure stability of the Parts and to ensure appropriately fast curing of the composition.

For compositions intended to flow readily prior to cure hollow entities of spherical configuration are preferred. Suitable materials are commercially available and comprise low density microcellular borosilicate spheres. Suitable materials include those having bulk density (as determined by ASTM D 3101-72) between about 0.07 and about 0.25 g/cm$^3$, a particle density (as determined by ASTM D 2840-69) between about 0.1 and about 0.6 g/cm$^3$, a particle size gradation of about 5 to 250 micron, an average particle diameter of about 30 to about 80 microns, and a wall thickness from about 0.5 to about 3 microns, typically from about 1 to about 2 microns. Preferred materials have a pressure resistance (measured according to ASTM D 3102-72) from about 60 to about 150 Bar. When a measure of non-slump behaviour is required of the composition, for example when the mixed composition is to be applied to seal a vertical joint, e.g. to provide a perimeter seal around a fire door, we prefer to employ entities which have an irregular configuration. Suitable materials are commercially available and comprise low density microcellular silicate or borosilicate irregular hollow shapes. Suitable materials include those having a bulk density (as determined by ASTM D 3101-72) between about 0.11 and about 0.18 g/cm$^3$, a particle density (as determined by ASTM D 2840-69) between about 0.18 and about 0.30 g/cm$^3$, a particle size gradation of about 5 to 300 micron, an average particle diameter from about 35 to about 75 microns and a wall thickness from about 0.5 to about 3 microns. Preferred materials have a pressure resistance (measured according to ASTM D 3102-72) from about 40 to about 150 Bars. These irregularly shaped entities not only reduce the bulk foam density of the cured foam but also influence the rheology of the mixed liquid composition. Due to their irregular surface structure these entities mechanically interlock within the polymer matrix and so serve to reduce the slump characteristics of the composition prior to cure. They do not, however, improve the compression resistance (structural strength) of the foam as much as the borosilicate hollow glass spheres do. Mixtures of spherical and irregular entities may be used if desired.

The foaming of a composition according to the invention may be achieved by chemical reaction of the silicon-bonded hydrogen atoms with silicon-bonded hydroxyl groups alone or may be assisted by water or an aliphatic alcohol or by inclusion in the composition of a volatile blowing agent. Compositions according to the invention preferably include one or more alcohols. These materials influence the structure of foams formed by use of the composition and yield cured foams of low density. The alcohol is selected with a view to contributing not only generation of hydrogen gas but also with a view to achieving desired resilience of the foam. Suitable alcohols include the primary aliphatic and araliphatic alcohols for example the lower aliphatic mono functional alcohols having up to 8 carbon atoms, e.g. ethanol, propanol and butanol and benzyl alcohol. Foams of lowest density are formed by use of the aliphatic alcohols having from 2 to 12 chain carbon atoms. Preferred compositions employ n-propanol.

A composition according to the invention may also include a foam stabiliser or surfactant. Suitable foam stabilising materials include fluorinated silicones, for example a poly-organosiloxane comprising

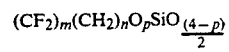

R$_3$SiO$_{\frac{1}{2}}$, SiO$_{4/2}$ units and silicon-bonded hydroxyl groups wherein each R represents a monovalent hydrocarbon group containing from 1 to 20 carbon atoms, m is an integer having an average value of from 1 to 20, n has the value 1 or 2, p has the value 1, 2 or 3. The polysiloxane may also include from 0 to 10 percent, based on the weight of said polyorganosiloxane, of GSiO$_{3/2}$ units wherein G represents the residue obtained by removing the hydrogen atom from a hydroxyl group of a linear organic polymer selected from the group consisting of homopolymers of ethylenically unsaturated alcohols, copolymers of these alcohols with ethylenically unsaturated hydrocarbons, polyethers and polyoxyalkylene glycols, wherein said organic polymer contains an average of at least one terminal hydroxyl group per molecule. These materials may be prepared by treatment of hexamethyldisiloxane coated polysilicates with the alcohol $F(CF_2)_8CH_2CH_2OH$, and are more fully described and claimed in European patent Specification 179 598. They serve to stabilise the structure of the foam during its curing and to assist mixing of the composition.

If desired other adjuvants maybe included in a composition according to the invention, for example fillers, colorants, coloured indicators and extenders. Fillers which may be used include, for example silica, ground quartz, calcium and magnesium carbonates and carbon black. Those compositions intended to be heated by microwave heating should also incorporate a filler e.g. carbon black which is susceptible to such heating.

In a composition according to the invention the polysiloxanes and other ingredients and the proportions thereof are selected so that the polymerising network is sufficiently developed and cured to produce a foam of desired structure within a short period of time of the order of a few minutes or less. In order to achieve this it is important that the ratio of silicon-bonded hydrogen atoms to all carbon-bonded or silicon-bonded hydroxyl groups, together with other reactive hydroxyl, unsaturated and other groups present in the composition is appropriate. This ratio may be in the range 1:1 to 35:1 and is preferably in the range 2:1 to 10:1. The ratio of silicon-bonded hydrogen atoms to carbon-bonded hydroxyl groups and silicon-bonded hydroxyl groups is suitably in the range 2:1 to 40:1 more preferably 2.5:1 to 11:1. The ratio of aliphatically unsaturated groups to silicon-bonded hydrogen atoms is preferably in the range 0:1 to 0.5:1 more preferably in the range 0.006:1 to 0.03:1. The ratio of aliphatically unsaturated groups to carbon-bonded hydroxyl groups and silicon-bonded hydroxyl groups may be in the range 0:1 to 1:1, more preferably 0.02:1 to 0.5:1. We have found that compositions in which the ingredients are present in the preferred ratios can be formulated to cure within 20 to 600 seconds of mixing of the composition at room temperature (i.e. of the order of 18° C. to 20° C.) and humidity (i.e. about 30% to 90% relative humidity) to provide cured foams of a density as low as from about 150 kg/m$^3$ to about 250 kg/m$^3$ when foamed freely. The foams formed are hydrophobic and generally comprise from about 20% to about 80% closed cells and correspondingly about 80% to about 20% open cells.

Compositions according to the invention may be mixed and dispensed using conventional mixing and dispensing equipment including not only industrial dispensing equipment but also commercially available two-component mixing hand-guns featuring disposable static mixers. They may be used for many purposes for example as sealant or moulding compositions. Foams formed by a process in which the expanding wet foam contacts a substrate surface adhere at least lightly without the use of a primer to various substrate materials including metals (e.g. steel, galvanised steel, painted or coated steel, mill-finish aluminium, anodised or coated aluminium), plastics (e.g. polyester and glass fibre reinforced polyester, PVC) and porous building substrates (e.g. marble, sandstone). Self-adhesion to most substrates is low but acceptable in those applications where the weight of the panel is carried by an adhesion area the full size of the panel. Adhesion to these substrates can be further improved by use of a primer composition comprising for example an orthosilicate and catalyst in a hydrocarbon solvent. Compositions may be prepared having a balanced combination of properties, e.g. viscosity, rising and cure times, suitable for use as self-levelling foams e.g. for filling between panels depending on the panel sizes to be filled, so as to achieve good filling of the panel, good self-adhesion and also reasonably fast cure for handling the panels within the factory and for later shipment. Compositions according to the invention may be formulated to provide foams capable of accepting up to 15% compression without the cell-structure suffering or being destroyed. The cured foams are rather rigid and display a good resistance to compression, tension and deflection and good fire resistance. They may be used for a variety of purposes for example as cladding or load bearing elements in the building or automotive industries. If desired, the foams may be further strengthened by incorporation of internal or external stiffeners. They are of particular interest in the field of light weight building elements and may be cast or moulded to form building elements of desired shape which may or may not incorporate interior or exterior reinforcing or decorative elements. They may be used for example to provide a core for building elements having outer surface layers of for example, building board, stone, metal or glass. They may be formed with integral lips, grooves or the like which serve a mechanical purpose, for example for assembly as a continuous wall of interlocking panels or blocks with or without the additional use of adhesive or sealant.

When producing mouldings by use of a composition according to the present invention, the composition may be introduced to an open or closed moulding cavity and the cavity may be left open to permit free foaming of the composition or may be closed and the foam produced under volume constraint as desired. When a foam of increased compression resistance, rigidity or brittleness is required, the foaming is preferably brought about in a closed moulding cavity the volume of which is at least 10% less than the volume which would be occupied by the foam produced by permitting the same quantity of the composition to foam and cure at room temperature without restriction. The moulding cavity may be of any desired design and may be for the production of any article. The moulding cavity may be provided by a mould comprising for example a base and side walls and a moveable top which provides closure means for closing the cavity. If desired one or more surfaces of the moulding cavity may be provided by a surface of an element, for example a building element, to which the cured foam is intended to adhere with or without the use of a surface primer. Alternatively, the moulding cavity may be defined by two preformed elements for example panels of building board, stone, metal or glass, spaced apart to provide a moulding cavity which is closed at its periphery by spacer elements, one or more of which provides closure means for the mould. We prefer that the moulding cavity is one designed for the production of building elements as aforesaid. Prior to introduction to the moulding cavity the composition is mixed, care being taken that the cure does not progress significantly before the composition is introduced to the moulding cavity. The composition may be mixed and introduced to the moulding cavity by any suitable means for example by injection or pouring. If desired a reinforcing member or members of for example honeycomb structure, textile or glass fibre batt may be present in the curing mass of the composition. Curing may be brought about by maintaining the mould at a temperature of the order of 18° to 35° C., although curing may be accelerated by heating the composition. After the moulding has formed and cured it may be removed from the moulding cavity, or the laminate comprising foam bonded to one or more panels may be removed.

Compositions according to the invention may be formulated for use to provide elastomeric low density silicone foam mouldings having high flexural strength, low compression set, and self-adhesion to panel substrates, leading to panels having good resistance to compression, tension, shear or deflection. The preferred silicone compositions cure at room temperature to rather rigid foams, which are suitable to form the structural core of sandwich panels installed horizontally or vertically for example as wall panels, exterior cladding panels, ceiling panels, floor panels or roofing panels. The cured mouldings may be further converted to a more crosslinked form by subjecting the mouldings to heat in a post cure after completion of the foaming process. This optional post cure may be useful with respect to the somewhat softer mouldings derived from compositions with lower proportions of glass entities, which thus may be converted to more rigidly elastomeric low density silicone foam mouldings having some at least of the mentioned properties. For the preferred compositions, post cure is not required but may be carried out optionally which results in very rigid, friable low density silicone foams. The post cure may be achieved for example, by maintaining the foam at a temperature of from about 80° C. to about 120° C. for from 1 to 24 hours in an oven. Mouldings e.g. those which are difficult to heat sufficiently in an oven, for example due to their size or due to the heat sensitive nature of panels to which the foam has been caused to adhere, may alternatively be subjected to a post cure by micro-wave heating; this method is effective for those foams which contain sufficient ingredients which demonstrate a heating effect when subjected to microwaves. The elastomeric properties of the post cured foams cannot be achieved by ageing the room temperature cured foam at room temperature.

In order that the invention may become more clear there now follows a description of example compositions some of which are according to the invention. All parts are by weight unless otherwise specified.

In the Examples the following materials were used:

The polysiloxane I having silicon-bonded hydrogen atoms was a trimethylsilyl endblocked polymethylhydrogensiloxane having a viscosity of about 30 mm$^2$/s and 1.5 mole % hydrogen.

The polysiloxane II having silicon-bonded hydrogen atoms was a trimethylsilyl end-blocked polysiloxane having methylhydrogensiloxane and dimethyl siloxane units having a viscosity of about 5 mm$^2$/s and 0.76 mole % hydrogen.

The polysiloxane III having silicon-bonded hydroxyl groups was a dimethylhydroxysilyl endblocked polydimethylsiloxane having a viscosity of about 13,500 mm$^2$/s and a hydroxyl content of about 0.066 mole %.

The polysiloxane IV having silicon-bonded hydroxyl groups was a dimethylhydroxylsilyl endblocked polydimethylsiloxane having a viscosity of about 42 mm$^2$/s and a hydroxyl content of 4 mole %.

The polydiorganosiloxane V having silicon-bonded unsaturated groups was a dimethylvinylsilyl endblocked polydimethylsiloxane having a viscosity of about 450 mm$^2$/s and 0.45 mole % vinyl groups.

The foam stabiliser was prepared by treatment of hexamethyldisiloxane coated polysilicates with the alcohol $F(CF_2)_8CH_2CH_2OH$, as more fully described in European Patent Specification 179 598.

Cyclic polymethylvinylsiloxane compounds were used to adjust the speed of cure.

N-propanol when present was used as a blowing agent for the low density foams.

Chloroplatinic acid, complexed with vinyldisiloxane, was used as the noble metal catalyst.

Filler 1 was a ground quartz of 5 micron particle size.

Filler 2 was an ultra-fine carbon black with high dielectric loss used for the purpose of microwave (RF) radiation absorbance.

Filler 3 was Microperl 050 Type "E" obtained from Sovitec, Avenue du Marquis, Zoning Industriel, 6220 Fleurus (Belgium). Microperl 050 Type "E" comprises monolithic borosilicate glass spheres having a bulk density (as determined by ASTM D3101-72) of about 1.6 g/cm$^3$, a particle density (as determined by ASTM D2840-69) of about 2.52 to about 2.56 g/cm$^3$, and a particle size gradation of about 0 to 50 microns. The glass spheres are treated with a vinyl functional silane by the manufacturer.

Filler 4 was Microperl 050 Type "E" treated with polysiloxane I, having silicon-bonded hydrogen atoms, by their manufacturer.

Filler 5 was Microcel M 18 obtained from Sovitec. Microcel M 18 comprises hollow borosilicate glass spheres having a bulk density (as determined by ASTM D3101-72) of about 0.11 g/cm$^3$, a particle density (as determined by ASTM D2840-69) of about 0.18 g/cm$^3$, an average particle diameter of about 80 microns, a wall thickness from about 1 to about 2 microns and a pressure resistance (as measured according to ASTM D3101-72) of about 60 Bar. The glass spheres are treated with a vinyl functional silane by the manufacturer.

Filler 6 was Microcel M 18 treated with polysiloxane I.

Filler 7 was Microcel M 18 which had been given no surface treatment.

Filler 8 was Microcel M 23 obtained from Sovitec. Microcel M 23 comprises hollow borosilicate glass spheres having a bulk density (as determined by ASTM D3101-72) of about 0.14 g/cm$^3$, a particle density (as determined by ASTM D2840-69) of about 0.23 g/cm$^3$, an average particle diameter of about 80 microns, a wall thickness from about 1 to about 2 microns and a pressure resistance (as measured according to ASTM D3101-72) of about 80 Bar. The glass spheres were treated with polysiloxane I by the manufacturer.

Filler 9 was Microcel M 35 obtained from Sovitec. Microcel M 35 comprises hollow borosilicate glass spheres having a bulk density (as determined by ASTM D3101-72) of about 0.19 g/cm$^3$, a particle density (as determined by ASTM D2840-69) of about 0.35 g/cm$^3$, an average particle diameter of about 80 microns, a wall thickness from about 1 to about 2 microns and a pressure resistance (as measured according to ASTM D3101-72) of about 150 Bar. The glass spheres were treated with a vinyl functional silane by the manufacturer.

Filler 10 was Microcel M 35 treated with polysiloxane I by their manufacturer.

Filler 11 was Sil-Cell 300, obtained from STAUSS GmbH, StifterstraBe 4, 3100 St. Pülten (Austria) (also supplied under the tradename "Spherulite" by Norwegian Talc France, Rue La Bruyére 27, 75009 Paris (France)), which comprises hollow silicate glass elements of irregular shapes having a bulk density (as determined by ASTM D3101-72) of about 0.11 g/cm³, a particle density (as determined by ASTM D2840-69) of about 0.18 g/cm³, a particle size range of 5 to 300 microns, an average particle diameter of about 75 microns, and a pressure resistance (as measured according to ASTM D 3101-7) of about 40 Bar. The glass spheres were surface modified by the manufacturer with a proprietary treatment.

Foam samples were prepared from the example compositions as follows. A mould was prepared comprising a base and four side walls normal to the base and so define a moulding cavity capable of producing foam plates 270 mm thick. The inner dimensions of the moulding cavity were 20 ×20×2.7cm corresponding to a volume of the moulding cavity 1080 cm³. Compositions were prepared by mixing equal volumes of the Parts A and B. Each of these example compositions was mixed to form a homogenous fluid and poured into the moulding cavity within 30 seconds of mixing. It was found that the compositions each cured in 120 to 600 seconds at room temperature to provide fine pored foams. The quantities of the compositions formed by mixing equal volumes of the Parts A and B required to produce a cured foam which just filled the mould are shown in the Tables as "Quantity (Ml)". These foam samples were removed from the moulding cavity and aged at room temperature for 14 days to allow complete diffusion of the hydrogen formed during the foaming reaction.

Fire resistance of sample foam plates was evaluated by positioning the plate at an angle of 45° over a blue flame of a blow torch and spaced 10 cm from the orifice of the torch with the tip of the blue flame just touching the plate. The time required for the flame to penetrate through the plate was measured.

The preferred foamed silicone compositions were also tested for their fire resistance in a Cone Calorimeter according to ASTM E1354-90. Cured foam samples, $10\times10\times3$ cm³ in size, were exposed to a heat flux of 35 kW/m². The preferred foamed silicon compositions having hollow borosilicate glass spheres as sole filer show exceptionally good fire behaviour, since they develop a char of high integrity and exhibit low smoke evolution and only small fissures and no splitting of the foam under the test conditions. Ignition times as determined under the above experimental conditions range from 12 to 19 seconds.

The Young's modulus of compression was determined by compressing silicone foam samples $7\times5\times1.5$ cm³ in size, positioned between two steel plates, at a speed of 6 mm/min on a Zwick extensiometer. The stress-strain curves recorded in the compression tests show constancy at a certain compression value. This suggests that the cellular structure of the silicone foam is destroyed once a certain compression strength is exceeded. Silicone foams that have been compressed beyond this critical threshold, further referred to as "elastic deformation limit", do not recover to their original shape, while foams that have been exposed to lower compression stresses fully recover.

Adhesion of the preferred silicone foam compositions to marble and coated steel substrates was tested by preparing a sandwich sample between marble and coated steel panels with foam dimensions of 10 ×5 ×1.5 cm³. The foam in the sandwich samples was allowed to cure for 14 days, then the sample was extended to break at a rate of 6 mm/min in a Zwick extensiometer. The breaking force as well as the failure mode were recorded.

EXAMPLE 1

Example compositions were prepared from equal proportions of Parts A and B the ingredients of which are shown in Tables IA and IB. The Parts A and B used and the properties of the resulting foams are shown in Table IC. The value given in Table IC for Molar Ratio is the ratio of silicon-bonded hydrogen atoms of the polysiloxane to all carbon bonded hydroxyl groups together with other reactive hydroxyl, unsaturated and other groups present in the composition. The value given for Ratio 2 is the ratio of silicon-bonded hydrogen atoms to silicon-bonded and carbon-bonded hydroxyl groups. The value given for Ratio 3 is the ratio of aliphatically unsaturated groups to silicon-bonded hydrogen atoms and the value given for Ratio 4 is the ratio of aliphatically unsaturated groups to carbon-bonded hydroxyl groups and silicon-bonded hydroxyl groups. Foam samples were prepared and tested as above described.

TABLE I (A)

| Ingredient | Parts A | | | |
| --- | --- | --- | --- | --- |
|  | A1 | A2 | A3 | A4 |
| Polydiorganosiloxane III | 43.80 | 42.49 | 41.17 | 39.86 |
| Polydiorganosiloxane V | 33.60 | 32.59 | 31.58 | 30.58 |
| Catalyst | 0.40 | 0.39 | 0.38 | 0.37 |
| Filler 1 | 16.80 | 6.30 | 15.79 | 15.29 |
| 2 | 5.40 | 5.24 | 5.08 | 4.91 |
| 3 | — | 3.00 | 6.00 | 9.00 |

TABLE I (B)

| Ingredient | Parts B | | | |
| --- | --- | --- | --- | --- |
|  | B1 | B2 | B3 | B4 |
| Polysiloxane I | 26.78 | 25.74 | 25.14 | 24.53 |
| Polysiloxane II | 1.44 | 1.19 | 1.03 | 0.88 |
| Polysiloxane III | 39.84 | 32.70 | 28.54 | 24.38 |
| Polysiloxane IV | 19.61 | 18.25 | 17.45 | 16.66 |
| Polydiorganosiloxane V | 1.31 | 1.08 | 0.94 | 0.80 |
| Methylvinylcyclics | 0.06 | 0.05 | 0.04 | 0.04 |
| Filler 1 | 10.96 | 9.00 | 7.85 | 6.71 |
| 4 | — | 12.00 | 19.00 | 26.00 |

TABLE I (C)

| Property | Compositions formed by mixing Parts | | | |
| --- | --- | --- | --- | --- |
|  | A1 + B1 | A2 + B2 | A3 + B3 | A4 + B4 |
| Molar Ratio 1 | 5.5:1 | 5.7:1 | 5.8:1 | 5.9:1 |
| 2 | 6.1:1 | 6.3:1 | 6.4:1 | 6.5:1 |
| 3 | 1:70.8 | 1:70.4 | 1:70.9 | 1:71.6 |
| 4 | 1:11.7 | 1:11.2 | 1:11.1 | 1:11.0 |
| Curing time (sec) | 300 | 340 | 360 | 420 |
| Quantity (ml) | 294 | 305 | 296 | 336 |
| Density (kg/m³) (Free Foam) | 195 | 240 | 280 | 320 |
| Elastomeric Properties |  |  |  |  |
| Young's modulus of Compression (MPa) | 0.05 | 0.12 | 0.20 | 0.32 |
| Elastic deformation limit (compression) | 40% | 30% | 25% | 20% |
| Fire Resistance (sec) | 600 | 720 | 850 | 980 |

As can be seen from Table IC, only a limited improvement in fire resistance and the Young's modulus of compression was achieved by filling a low density silicone foam with a monolithic (borosilicate) glass filler. Compared with the low density foam containing no glass spheres (A1+B1), filling the silicone foam composition with 17.5% by weight of monolithic borosilicate glass spheres (A4+B4) increased the Young's modulus by a factor of 6, while the fire resistance increased roughly by 50%. At the same time the density of the foam increased by more than 50%. A medium density silicone foam having a density of 310 g/cm³ displays a higher fire resistance (1300 sec) but a lower Young's modulus of compression (0.13). In order to achieve a foam of rather rigid structure a high proportion of monolithic glass spheres would be required which would lead to a prohibitively high specific density.

EXAMPLE 2

Compositions were processed in a similar manner to that employed in Example 1 but the compositions shown in Tables IIA and IIB were used. Physical properties of the compositions and the mouldings are shown in Table IIC. This example shows the effect of the presence in a low density silicone foam composition of a low density, hollow borosilicate glass spheres filler. The viscosity of the compositions is greater for those compositions which include more than 25% and therefore the more preferred compositions for use as a self-levelling foam suitable for larger panels (up to 2.5 ×2.5 m² size) contain up to 15% glass spheres filler.

TABLE II (A)

| Ingredient | Parts A | | | | | | |
|---|---|---|---|---|---|---|---|
| | A5 | A6 | A7 | A8 | A9 | A10 | A11 |
| Polysiloxane III | 37.31 | 36.41 | 35.52 | 34.62 | 33.20 | 29.85 | 26.49 |
| Polysiloxane IV | 12.80 | 12.49 | 12.19 | 11.88 | 11.39 | 10.24 | 9.09 |
| N-propanol | 0.53 | 0.52 | 0.50 | 0.49 | 0.47 | 0.42 | 0.38 |
| Polydiorgano-siloxane V | 28.62 | 27.93 | 27.25 | 26.56 | 25.47 | 22.90 | 20.32 |
| Foam Stabiliser | 1.06 | 1.03 | 1.00 | 0.98 | 0.94 | 0.85 | 0.75 |
| Catalyst | 0.77 | 0.75 | 0.73 | 0.72 | 0.69 | 0.62 | 0.55 |
| Filler 1 | 14.31 | 13.97 | 13.62 | 13.28 | 12.74 | 11.45 | 10.16 |
| 2 | 4.60 | 4.49 | 4.38 | 4.27 | 4.09 | 3.70 | 3.27 |
| 9 | — | 2.40 | 4.80 | 7.20 | 11.00 | 20.00 | 29.00 |

TABLE II (B)

| Ingredient | Parts B | | | | | | |
|---|---|---|---|---|---|---|---|
| | B5 | B6 | B7 | B8 | B9 | B10 | B11 |
| Polysiloxane I | 52.64 | 48.64 | 44.64 | 40.64 | 37.38 | 31.59 | 25.80 |
| Polysiloxane II | 0.16 | 0.15 | 0.14 | 0.12 | 0.11 | 0.10 | 0.08 |
| Polysiloxane III | 4.44 | 4.10 | 3.77 | 3.43 | 3.15 | 2.66 | 2.18 |
| Polysiloxane IV | 40.84 | 37.74 | 34.64 | 31.54 | 29.00 | 24.51 | 20.02 |
| Polysiloxane V | 0.15 | 0.14 | 0.12 | 0.11 | 0.10 | 0.09 | 0.07 |
| Methylvinylcyclics | 0.54 | 0.50 | 0.45 | 0.41 | 0.38 | 0.32 | 0.26 |
| Filler 1 | 1.22 | 1.13 | 1.04 | 0.94 | 0.87 | 0.73 | 0.60 |
| 10 | — | 7.6 | 15.20 | 22.80 | 29.00 | 40.00 | 51.00 |

TABLE II (C)

| Cured properties: Property | Compositions formed by mixing Parts | | | | | | |
|---|---|---|---|---|---|---|---|
| | A5 + B5 | A6 + B6 | A7 + B7 | A8 + B8 | A9 + B9 | A10 + B10 | A11 + B11 |
| Molar Ratio 1 | 4.1:1 | 4.0:1 | 3.9:1 | 3.9:1 | 3.8:1 | 3.7:1 | 3.6:1 |
| 2 | 4.3:1 | 4.3:1 | 4.2:1 | 4.1:1 | 4.1:1 | 4.0:1 | 3.9:1 |
| 3 | 1:165 | 1:156 | 1:146 | 1:137 | 1:132 | 1:124 | 1:114 |
| 4 | 1:38.1 | 1:36.6 | 1:35.0 | 1:33.4 | 1:32.5 | 1:31.1 | 1:29.5 |
| Curing time (sec) | 140 | 250 | 280 | 300 | 300 | 350 | 400 |
| Quantity (ml) | 184 | 216 | 232 | 241 | 252 | 280 | 315 |
| Density (kg/m³) (Free Foam) | 188 | 212 | 220 | 220 | 222 | 227 | 235 |
| Elastomeric Properties | | | | | | | |
| Young's modulus of Compression (MPa) | 0.04 | 0.14 | 0.41 | 0.89 | 1.04 | 1.6 | 2.0 |
| Elastic deformation limit (compression) | 30% | 25% | 20% | 15% | 15% | 10% | 10% |
| Fire Resistance (sec) | 1000 | 1500 | 2000 | | 2200 | 2400 | 2600 |

As can be seen from Table II (C) the addition of hollow borosilicate glass spheres to the foam compositions significantly increases the resistance to compression, as measured by the Young's modulus of compression, without having a substantial negative effect on the density. Depending on the mixing and metering equipment employed the optimum glass spheres can be chosen in terms of the glass spheres particle density versus their pressure resistance. An even lower dependency of the specific density of the glass spheres filled silicone foam on the glass spheres filler level can be achieved with glass spheres of lower particle wall thicknesses.

The Young's compression modulus of the hollow borosilicate glass spheres/silicone foam composite may be predicted by the following rule:

$E_C = V_1 \times E_G + V_2 \times E_P$ wherein $E_C$ is the Young's modulus of compression for the silicone foam/glass spheres composite, $E_G$ is the equivalent Young's modulus that can be associated with the glass spheres, $V_1$ is the volume occupied by the spheres, divided by the total volume occupied by the composite foam, $V_2$ is the volume occupied by the foam polymeric network divided by the total volume occupied by the composite foam.

The fire resistance of the glass spheres filled silicone foams obviously improves with increasing filler levels. At the same time the viscosity of the uncured foam composition increases which limits the achievable filler level for the self-levelling formulations to around 35%. Preferred compositions are based on 5 to 15% hollow borosilicate glass spheres.

EXAMPLE 3

This example demonstrates preferred self-levelling silicone foam compositions and the need for surface treatment of the borosilicate glass spheres to achieve good shelf-life. Compositions were processed in a similar manner to that employed in Example 1 but the compositions shown in Tables III (A) and III (C) were used.

Physical properties of the compositions and the mouldings are shown in Tables III (B) and III (D).

TABLE III (A)

| Ingredient | Parts | | | |
|---|---|---|---|---|
| | A13 | B13 | A14 | B14 |
| Polysiloxane I | — | 45.52 | — | 46.03 |
| II | — | 0.13 | — | 0.25 |
| Polysiloxane III | 36.17 | 3.57 | 40.20 | 7.14 |
| Polysiloxane IV | 12.40 | 34.68 | — | 27.36 |
| N-propanol | 0.55 | — | 2.30 | — |
| Polysiloxane V | 27.75 | 0.12 | 30.73 | 0.24 |
| Methylvinylcyclics | — | 0.41 | — | 0.01 |
| Foam Stabiliser | 1.05 | — | — | — |
| Catalyst | 0.58 | — | 0.67 | — |
| Filler 1 | 13.87 | 0.9 | 15.46 | 1.97 |
| 2 | 4.70 | — | 5.24 | — |
| 5 | 3.20 | — | 5.40 | — |
| 6 | — | 14.60 | — | 17.00 |

TABLE III (B)

Compositions formed by mixing Parts

| Property | A13 + B13 | A14 + B14 |
|---|---|---|
| Molar Ratio 1 | 4.0:1 | 5.8:1 |
| 2 | 4.2:1 | 6.1:1 |
| 3 | 1:147 | 1:134 |
| 4 | 1:34.7 | 1:22.0 |
| Viscosity (cS) $w = 2.1\ sec^{-1}$) | | |
| Part A | 5,000 | 13,000 |
| Part B | 5,000 | 5,000 |
| Curing time (sec) | 300 | 300 |
| Quantity (ml) | 303 | 267 |
| Density (kg/m$^3$) (Free Foam) | 220 | 170 |
| Elastomeric Properties | | |
| Young's modulus of Compression (MPa) | 2.5 | 1.5 |
| Elastic deformation limit (compression) | 15% | 15% |
| Adhesion to steel | | |
| without primer | | |
| Tensile strength: | 0.045 MPa | |
| Failure mode: | adhesive | |
| with siloxane primer | | |
| Tensile strength: | 0.092 MPa | |
| Failure mode: | cohesive | |
| Fire Resistance (sec) | 1980 | 1200 |

As can be seen from Table III (B) extremely high compression and excellent fire resistance can be achieved by combining a short-chain length hydroxyl-endblocked polydimethylsiloxane and a hollow borosilicate glass spheres filler. The Young's modulus of compression of formulation A13+B13 is roughly 15 times higher than that of a regular medium density (310 g/cm$^3$) silicone foam, whilst its fire resistance is roughly 50% higher, these properties being achieved at a density 50% lower than that of the medium density foam.

TABLE III (C)

| Ingredient | Parts | | |
|---|---|---|---|
| | A15 | B15 | B16 |
| Polysiloxane I | — | 45.52 | 45.52 |
| Polysiloxane II | — | 0.13 | 0.13 |
| Polysiloxane III | 36.17 | 3.57 | 3.57 |
| Polysiloxane IV | 12.40 | 34.68 | 34.68 |
| N-propanol | 0.55 | — | — |
| Polysiloxane V | 27.75 | 0.12 | 0.12 |
| Methylvinylcyclics | — | 0.41 | 0.41 |
| Foam Stabiliser | 1.05 | — | — |
| Catalyst | 0.58 | — | — |
| Filler 1 | 13.87 | 0.98 | 0.98 |
| 2 | 4.70 | — | — |
| 5 | — | — | 14.60 |
| 7 | 3.20 | 14.60 | — |

TABLE III (D)

| Properties of cured foam after storage of liquid foam components at room temperature after 1, 2, 3 or 60 days | Compositions formed by mixing Parts | | | | |
|---|---|---|---|---|---|
| | A13 + B13 | A15 + B15 | A13 + B15 | A15 + B13 | A13 + B16 |
| Curing time (sec) | | | | | |
| 1 day | 300 | 2400 | 2100 | 360 | 340 |
| 2 days | 300 | >3600 | >3600 | >3600 | 340 |
| 3 days | 300 | >3600 | >3600 | >3600 | 340 |
| 60 days | 360 | >3600 | >3600 | >3600 | 450 |
| Young's modulus of Compression (MPa) | | | | | |
| 1 day | 2.5 | <0.1 | <0.1 | 2.2 | 2.4 |
| 2 days | 2.5 | <0.1 | <0.1 | >0.1 | 2.4 |
| 3 days | 2.5 | <0.1 | <0.1 | >0.1 | 2.4 |
| 60 days | 2.5 | <0.1 | <0.1 | >0.1 | 2.2 |
| Fire Resistance (sec) | | | | | |
| 1 day | 1980 | <600 | <600 | 1800 | 2100 |
| 2 days | 2100 | <600 | <600 | 900 | 2100 |
| 3 days | 1920 | <600 | <600 | <600 | 1920 |
| 60 days | 2100 | <600 | <600 | <600 | 1800 |

As can be seen from Table III (D) the surface treatment of the hollow borosilicate glass spheres filler is essential in order to achieve a sufficiently long shelf-life of the liquid foam components. Treating the borosilicate glass filler of the Part of the composition containing the noble metal catalyst with a vinylfunctional silane, and the borosilicate filler of the Part containing the polysiloxane having silicon-bonded hydrogen with a polysiloxane having a silicon-bonded bonds, results in a shelf-life in excess of 2 months if both parts are stored at room temperature. A comparable shelf-life is achieved if the borosilicate glass filler in both Parts of the composition is treated with the vinylfunctional silane. Shelf-life rapidly degrades if the borosilicate glass filler in one of the parts is not surface treated. This is especially true for the borosili-cate filler contained in part B since its proportion represents the large share in the filler split between both parts. The negative influence of the use of untreated borosilicate filler in part A of the composition (containing the noble metal catalyst) on the shelf-life can in part be overcome by increasing the noble metal catalyst proportion.

EXAMPLE 4

This Example demonstrates the use of irregular shaped hollow silicate glass particles to achieve a "controlled" slump silicone foam composition. It also shows the benefit of adding hollow borosilicate glass spheres as a further filler to the composition in order to achieve higher compression resistance and higher structural strength. Compositions were processed as in Example 1 using compositions shown in Table IV (A). Physical properties are shown in Table IV (B).

TABLE IV (A)

| Formulations | A17 | B17 | A18 | B18 |
|---|---|---|---|---|
| Polysiloxane I | — | 37.46 | — | 41.00 |
| Polysiloxane II | — | 0.22 | — | 0.14 |
| Polydiorganosiloxane III | 33.11 | 5.95 | 33.10 | 7.74 |
| Polysiloxane IV | 10.00 | 34.14 | 7.75 | 28.73 |
| N-propanol | 2.00 | — | 2.00 | — |
| Polydiorganosiloxane V | 25.40 | 0.20 | 25.40 | 0.26 |
| Methylvinylcyclics | — | 0.41 | — | 0.61 |
| Foam Stabiliser | — | — | — | — |
| Catalyst | 0.70 | — | 0.75 | — |
| Filler 1 | 12.70 | 1.64 | 12.70 | 2.22 |
| 2 | 4.08 | — | 4.30 | — |
| 8 | — | — | — | 10.30 |
| 11 | 12.00 | 20.00 | 14.00 | 9.00 |

TABLE IV (B)

| Cured properties | Compositions formed by mixing Parts | |
|---|---|---|
| Property | A17 + B17 | A18 + B18 |
| Molar Ratio 1 | 3.2:1 | 4.0:1 |
| 2 | 3.4:1 | 4.4:1 |
| 3 | 1:132 | 1:144 |
| 4 | 1:38.8 | 1:32.9 |
| Slump in 20 mm U-channel (mm) (during 10 mins) | 5 | 15 |
| Curing time (sec) | 240 | 450 |
| Quantity (ml) | 280 | 322 |
| Density (kg/m$^3$) (Free Foam) | 160 | 180 |
| Elastomeric Properties | | |
| Young's modulus of Compression (MPa) | 1.21 | 2.56 |
| Elastic deformation limit (compression) | 15% | 15% |
| Fire Resistance (sec) | 700 | 930 |

As can be seen from Table IV (B) both foam compositions show good slump control which allows to apply the foams in vertical joints up to 20 mm wide, such as in perimeter joints around fire doors. Further addition of hollow borosilicate glass spheres filler improves the compression resistance which can easily be seen by comparing the Young's modulus of compression for formulations A17+B17 and A18+B18.

That which is claimed is:

1. A foamable silicone composition comprising a polysiloxane having silicon-bonded hydrogen atoms, a polysiloxane having siloxane units including unsaturated groups, a polysiloxane having silicon-bonded hydroxyl groups, a noble metal catalyst and from 3 to 40 parts by weight per 100 parts by weight of the composition of entities of borosilicate or silicate glass or mixtures thereof, the composition comprising first and second Parts having viscosities which are sufficiently similar to each other to permit facile machine mixing of the Parts and the first Part comprising the noble metal catalyst and a portion of the entities and the second Part comprising the polysiloxane having silicon-bonded hydrogen atoms and a portion of the entities pretreated with a compatible silane or polysiloxane having silicon-bonded hydrogen atoms, wherein said entities comprise hollow spherical particles and are selected from those having a bulk density (as determined by ASTM D 3101-72) between about 0.07 and about 0.25 g/cm$^3$, a particle density (as determined by ASTM D 2840-69) of between about 0.1 and about 0.6 g/cm$^3$, a particle size gradation of about 5 to about 250 microns, an average particle diameter from about 30 to about 80 microns, a wall thickness from about 1 to about 2 microns and a pressure resistance (as measured according to ASTM D 3102-72) from about 60 Bar to about 150 Bar.

2. A composition according to claim 1 wherein the entities comprise hollow entities which have an irregular configuration selected from those having a bulk density (as determined by ASTM D 3101-72) between about 0.11 and about 0.18 g/cm$^3$, a particle density (as determined by ASTM D 2840-69) between about 0.18 and about 0.30 g/cm$^3$, a particle size gradation of about 5 to 300 microns, an average diameter from about 35 to about 75 microns and a wall thickness from about 0.5 to about 3 microns.

3. A composition according to claim 1 wherein the entities of the first Part of the composition have been treated with a compatible silane.

4. A composition according to claim 1 or claim 3 wherein the compatible silane is a vinyl silane.

5. A composition according to claim 1 wherein the polysiloxanes having silicon-bonded hydrogen atoms are polymers having units according to the general formula

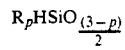

with or without the presence of $R_2SiO$ units in which each R represents a methyl group, and p is 1 or 2, and having a viscosity of about 5 to about 50 mm$^2$/s.

6. A composition according to claim 1 wherein the polysiloxane having siloxane units including unsaturated groups has not less than two silicon-bonded aliphatically unsaturated groups per molecule and has a viscosity in the range 100 to 2000 mm$^2$/s.

7. A composition according to claim 1 wherein the polysiloxane having silicon-bonded hydroxyl groups comprises a silanol terminated polydioganosiloxane according to the general formula $HO((R_2)SiO)_sH$ in which each R represents a methyl group and s has a value from about 10 to about 1200.

8. A composition according to claim 1 also comprising an alcohol.

9. A composition according to claim 1 wherein the proportions of the ingredients is such that the ratio of silicon-bonded hydrogen atoms of the polysiloxane (A) to all silicon-bonded hydroxyl groups and carbon-bonded hydroxyl groups together with other reactive hydroxyl, unsaturated and other groups present in the composition is in the range 1.0:1 to 35.0:1.

10. A composition according to claim 1 wherein the proportions of the ingredients is such that the ratio of silicon-bonded hydrogen atoms to carbon-bonded hydroxyl groups and silicon-bonded hydroxyl groups is in the range 2.0:1 to 40.0:1.

11. A composition according to claim 1 wherein the proportions of the ingredients is such that the ratio of aliphatically unsaturated groups to silicon-bonded hydrogen atoms is in the range 0:1 to 0.5:1.

12. A composition according to claim 1 wherein the proportions of the ingredients of the silicone composition is such that the ratio of aliphatically unsaturated groups to carbon-bonded hydroxyl groups and silicon-bonded hydroxyl groups is in the range 0:1 to 1:1.

13. An article formed by foaming and curing a composition according to claim 1.

14. An article according to claim 13 wherein after completion of the foaming the moulding is heated to effect a post cure.

15. An article according to claim 13 comprising an internal or external stiffener.

16. An article according to claim 13 in the form of a building element.

17. An article according to claim 16 comprising an exterior reinforcing or decorative layer of building board, stone, metal or glass.

18. An article according to claim 17 formed with integral lips or grooves.

* * * * *